United States Patent [19]

Moriya et al.

[11] Patent Number: 5,180,603
[45] Date of Patent: Jan. 19, 1993

[54] PROCESS FOR PRODUCING BAKERY PRODUCT HAVING LAYERED STRUCTURE

[75] Inventors: Iwao Moriya; Masayuki Sugie; Masayoshi Iwasaki; Junichiro Sakata, all of Tokyo, Japan

[73] Assignee: Asahi Denka Kogyo Kabushiki Kaisha, Tokyo, Japan

[21] Appl. No.: 788,300

[22] Filed: Nov. 5, 1991

[30] Foreign Application Priority Data

Nov. 7, 1990 [JP] Japan .................................. 2-301423

[51] Int. Cl.⁵ .............................................. A21D 13/08
[52] U.S. Cl. .................................... 426/556; 426/502; 426/601; 426/604
[58] Field of Search ............... 426/556, 502, 601, 604

[56] References Cited

U.S. PATENT DOCUMENTS 3,615,682 10/1971 La Baw .

FOREIGN PATENT DOCUMENTS 59-11141 1/1984 Japan .
62-35739 8/1987 Japan .
63-22133 1/1988 Japan .
1-202245 8/1989 Japan .

*Primary Examiner*—Jeanette Hunter
*Assistant Examiner*—Mary S. Mims
*Attorney, Agent, or Firm*—Young & Thompson

[57] ABSTRACT

A process for producing a bakery product having a layered structure, wherein a roll-in fat which has a good spreadability at a temperature of 10° C. or above and rapidly hardens at a temperature lower than 10° C. in used and the rolling-in operation is effected at a temperature of the fat of 10° C. or above while the final sheeting is effected at a dough temperature lower than 10° C.

4 Claims, 1 Drawing Sheet

PRIOR ART

PROCESS FOR PRODUCING BAKERY PRODUCT HAVING LAYERED STRUCTURE

BACKGROUND OF THE INVENTION

1. Field of the Invention

This invention relates to a process for producing a bakery product having a layered structure, such as Danish pastry, croissant or pie.

2. Description of the Prior Art

Bakery products having a layered structure containing a roll-in fat may be broadly classified into those produced by using yeast, such as Danish pastry and croissant, and those produced without using yeast, such as pie. Each of these bakery products may be produced by sheeting and folding a dough, which has been prepared by kneading a mixture comprising, for example, wheat flour, salt, sugar and water, together with a plastic fat such as butter or margarine several times, allowing the layered dough thus obtained for an appropriate retarding time, then subjecting it to the final sheeting, stamping out a suitable shape from the dough, molding it into a desired shape, effecting the final proofing, which is unnecessary in the case of a pie, and then baking.

There has been attempted, in the main, to develop a fat which is highly spreadable over a wide temperature range and has a high consistency, in order to form excellent flaky layers in the inner phase of the final bakery product produced by the aforesaid process. This is because the fat to be rolled in the dough should have a high spreadability suited to the dough. When the fat to be rolled in the dough is excessively hard, not only the obtained final product has a poor flavor, but also the fat cannot be distributed into the whole dough and any homogeneous product cannot be obtained from the non-uniform dough thus formed. When the fat is excessively soft, on the contrary, it would lose the shape retentiveness during the roll-in procedure. Thus it would run or be incorporated in the dough, which makes the processability poor. As a result, the final product has scarcely any flaky layer. In order to prevent these phenomena, it is a common practice to refrigerate the fat one or several times during the roll-in process so as to prevent the softening of the fat and to restore the working properties of the wheat flour dough, thus adjusting the spreadability of the dough and that of the fat. Therefore it has been required to develop a fat, which has a good spreadability within a low temperature range, to be used in the aforesaid process for producing bakery products. Thus it has been proposed to add a thickener to the aqueous phase of an water-in-oil emulsion fat (refer to Japanese Patent Laid-Open No. 11141/1984), to blend glyceryl monoacetate with the aqueous phase of a water-in-oil emulsion fat (refer to Japanese Patent Publication No. 35739/1987) and to restrict the fatty acid composition of a fat (refer to Japanese Patent Laid-Open No. 22133/1985) to thereby improve the spreadability of a fat.

Recently, however, consumers have a marked trend toward fat-free foods for the reason of health and thus the consumption of fat-rich products such as Danish pastry, croissant or pie has been stagnant. When it is attempted to produce a low-fat product (i.e., one containing less roll-in fat), the roll-in fat is incorporated into the dough layer 2, due to the good spreadability of the fat, during the roll-in or final sheeting operation, so that the fat layer 1 becomes very thin or disappears (refer to FIG. 2). As a result, the final product has no layered structure but an inner phase of a so-called bread-like (sponge) texture just like that of a butter roll, which deteriorates the texture and voluminousness of the product.

In order to prevent these phenomena, Japanese Patent Laid-Open No. 202245/1989 proposes the use of a fat which has a high protein concentration and is in the form of a stable oil-in-water emulsion. However this method has some disadvantages, for example, the oil-in-water fat results in poor keeping qualities and it is necessary to add a sizing agent to the aqueous phase, which makes the texture poor.

A conventional bakery product rich in a roll-in fat has a layered structure consisting of a fat layer 1 and a dough layer 2, as shown in FIG. 3.

SUMMARY OF THE INVENTION

The present inventors have conducted intensive studies in order to solve the aforesaid problems. As a result, they have found out that a bakery product, which has a layered structure and is excellent in flakiness, voluminousness and texture even at a low fat concentration, can be obtained by using a roll-in fat, which hardens within a low temperature range and is not spread, contrary to conventional ones, and effecting the final sheeting after sufficiently lowering the temperature.

Accordingly, the present invention, which has been completed based on the above finding, provides a process for producing a bakery product having a layered structure which comprises using a roll-in fat which shows a good spreadability at a temperature of 10° C. or above and rapidly hardens at a temperature lower than 10° C., effecting the rolling-in at the temperature of said fat of 10° C. or above, and effecting the final sheeting at a dough temperature of lower than 10° C.

According to the process for producing a bakery product of the present invention, the roll-in fat layer having an appropriate hardness would break into pieces while substantially maintaining its thickness during the final sheeting operation. As a result, the roll-in fat is not incorporated into the wheat flour dough layer but maintained in a state as if flaky roll-in fat pieces were embedded in the wheat flour dough layer.

Thus a bakery product having a layered structure (for example Danish pastry, Croissant or pie), which has a highly flaky inner phase and is excellent in texture and meltability in the mouth even at a low concentration of the roll-in fat, can be obtained.

DETAILED DESCRIPTION OF THE INVENTION

Figure 1:
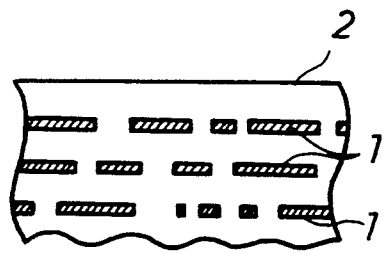
FIG. 1 is a partial sectional view of the inner phase of the dough of the bakery product of the present invention in the final sheeting, i.e., immediately before the molding.
Figure 2:
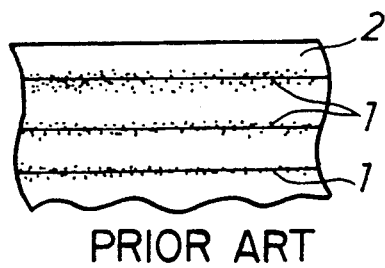
FIG. 2 is a partial sectional view of the inner phase of a conventional bakery product containing less roll-in fat.
Figure 3:
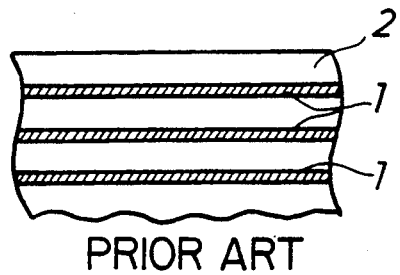
FIG. 3 is a partial sectional view of the inner phase of another conventional bakery product rich in roll-in fat.

The dough to be used in the present invention is not particularly restricted. Thus known ones for bakery products may be employed therefore.

The ratio of the roll-in fat to the dough may range from 10 to 50% by weight, preferably from 20 to 25% by weight. When the amount of the roll-in fat is excessively small, the obtained bakery product cannot from any definite layer. When the amount thereof is excessively large, on the other hand, the inner phase membrane becomes excessively thick and a large amount of the fat melts in the baking stage, which makes the final product greasy.

In the present invention, procedures till the rolling-in operation may be performed in accordance with a common process for producing bakery products.

It is an important feature of the present invention to use a roll-in fat which has a high spreadability at a temperature of 10° C. or above and rapidly hardens at a temperature lower than 10° C. It has been believed in the art that a roll-in fat suffering little change in the solid fat content even with a temperature change is preferable since it scarcely hardens at an elevated temperature during the rolling-in operation. In the present invention, on the contrary, a roll-in fat undergoing a large change in the solid fat content is employed.

Namely, the roll-in fat to be used in the present invention has a low solid fat content in the rolling-in operation and is highly spreadable. In the final sheeting stage, however, it has a high solid fat content and is in a hardened state. It is particularly preferable to use a roll-in fat having a solid fat content of from 20 to 40 at 15° C., from 30 to 50 at 10° C. and 35 or above at 5° C.

When the solid fat content of the roll-in fat at 15° C. is smaller than 20, the roll-in fat excessively softens in the rolling-in operation. As a result, the roll-in fat is sometimes incorporated in the dough or runs. When the solid fat content thereof at 15° C. exceeds 40, on the other hand, it cannot be homogeneously distributed in the whole dough and thus the obtained dough becomes heterogeneous.

When the solid fat content of the roll-in fat at 5° C. is smaller than 35, the fat cannot break into pieces but is spread in the sheeting operation, thus being easily incorporated in the dough. As a result, the final product often has an inner phase of a bread-like texture.

The roll-in fat to be used in the present invention is not particularly restricted and may be selected from among, for example, butter, margarine, shortening and lard.

In the present invention, the temperature of the fat in the rolling-in operation may be 10° C. or above, preferably range from 10° to 20° C. When the temperature is excessively low, the dough is spreadable but the fat is non-spreadable. In this case, the fat cannot be homogeneously distributed, which brings about some undesirable results, for example, the formation of a non-layered part of the inner phase of the final product. When the temperature is excessively high, the fat melts during the operation and thus is incorporated in the dough. In this case, definite layers can be hardly formed.

In the present invention, the folding number (i.e., the number of layers) may preferably range from 8 to 36 in the case of Danish pastry dr croissant or from 27 to 256 in the case of pie.

When the folding number is excessively small, the obtained bakery product has a rough layered structure consisting of easily peelable layers. Thus only a poor product can be produced in this case. When it is excessively large, on the other hand, fat layers are incorporated into the dough layers during the production process. As a result, no layered structure is formed and the obtained product has only a poor crispness. In the case of, for example, Danish pastry or croissant, it is the most desirable that 20% by weight, based on the dough, of a roll-in fat is used and the folding number is adjusted to 12 to 24 as a standard. Then the folding nubmer is increased with an increase in the fat content, while the former is decreased with a decrease in the latter.

When the content of the roll-in fat is increased without changing the folding number, the fat layers would break into larger pieces in the final sheeting operation. As a result, the inner phase of the final product becomes rough and voids are apt to be formed. When the content of the roll-in fat is decreased without changing the folding number, on the other hand, the fat layers are incorporated into the dough layers during the rolling-in and final sheeting operations. In this case, it is sometimes observed that the inner phase of the obtained final product has a bread-like texture.

After the completion of the rolling-in, the dough is refrigerated in a refrigerator until the temperature at the center of the dough is lowered below 10° C., preferably from −10° to 10° C. When a freezer is to be used, it is recommended to achieve a uniform temperature distribution by transferring the dough to a refrigerator before the surface of the dough is frozen, since rapid cooling would cause a large difference in the temperature between the surface of the dough and the center thereof. When the dough is to be cooled in a refrigerator alone, it is preferable to keep the dough in the refrigerator overnight so as to establish a uniform temperature distribution.

After taking out the dough, the center temperature of which is lower than 10° C., from the refrigerator, it is preferable to immediately effect the final sheeting. It may be sheeted until the thickness reaches 3 to 8 mm with the use of, for example, a reverse sheeter. As shown in FIG. 1, the roll-in fat layers break into pieces while maintaining a given thickness. As a result, the sheeted dough is in a state as if flaky roll-in fat pieces were embedded in the wheat flour dough layer. Thus a bakery product having excellent flakiness, wherein the fat is not incorporated into the dough and thus the fat layers do not disappear in spite of the low content of the roll-in fat, can be obtained.

When the final sheeting is effected at a temperature of 10° C. above, the fat is not broken but is thinly spread and incorporated into the dough layers. As a result, the obtained final product has a bread-like texture. In this case, therefore, any bakery product having an excellent flakiness, i.e., the object of the present invention, cannot be obtained.

After the completion of the final sheeting, the subsequent procedures (i.e., molding, final proofing and baking) may be performed in accordance with a conventional method for producing bakery products.

To further illustrate the present invention, the following Example and Comparative Examples will be given.

EXAMPLE 1

Croissants were produced by using each roll-in margarine having the solid fat content of the fat phase as specified in the following table. The formulation and production process are as follows.

| Temperature (°C.) | 0 | 5 | 10 | 15 | 20 |
|---|---|---|---|---|---|
| Solid fat content of fat phase | 49 | 42 | 35 | 27 | 22 |

[Formulation of croissant]

hard wheat flour 100 parts by weight

-continued

| | |
|---|---|
| sugar | 8 parts by weight |
| skim milk | 4 parts by weight |
| activated gluten | 2 parts by weight |
| salt | 1.5 parts by weight |
| yeast | 6 parts by weight |
| water | 58 parts by weight |
| fat for bakery | 5 parts by weight |
| roll-in margarine | 46 parts by weight |
| | (25% based on dough) |

Production process (1) Mixing: 3 minutes at low speed, 3 minutes at medium speed.
Adding fat for bakery.
3 minutes at low speed, 3 minutes at medium speed, 3 minutes at high speed.
(2) Dough temperature: 14° C.
(3) Retarding 1: In refrigerator (0° C.) for 100 minutes. (covered with a vinyl sheet to thereby prevent the surface from drying.)
(4) Rolling-in: Temperature of roll-in fat: 12° C.
Folding in 3 layers, folding in 2 layers and folding in 3 layers.
Temperature of the obtained layered dough: 15° C.
(5) Retarding 2: Cooling in freezer (−20° C.) until the center temperature reaches 5° C. Retarding in refrigerator (0° C.) overnight.
Dough temperature immediately before final sheeting: 2° C.
(6) Sheeting/molding: Sheeting the dough till a thickness of 6 mm.
Cutting into triangular pieces (130 mm in base, 190 mm in height) and molding into croissant-shape.
(7) Final proofing: 31° C., 85% RH, 120 minutes.
(8) Baking: 180° C., 23 minutes.

COMPARATIVE EXAMPLE 1

Croissants were produced by using each roll-in margarine having a solid fat content of the fat phase as specified in the following table (i.e., a roll-in fat which had a poor spreadability at a temperature of 10° C. or above and would not rapidly harden at a temperature lower than 10° C.). The same formulation and production process as those described in the Example 1 were employed.

| Temperature (°C.) | 0 | 5 | 10 | 15 | 20 |
|---|---|---|---|---|---|
| Solid fat content of fat phase | 55 | 51 | 47 | 43 | 32 |

COMPARATIVE EXAMPLE 2

Croissants were produced by using each roll-in margarine having a solid fat content of the fat phase as specified in the following table (i.e., a roll-in fat which had a good spreadability at a temperature of 10° C. or above but would not rapidly harden at a temperature lower than 10° C.). The same formulation and production process as those described in the Example 1 were employed.

| Temperature (°C.) | 0 | 5 | 10 | 15 | 20 |
|---|---|---|---|---|---|
| Solid fat content of fat phase | 36 | 32 | 26 | 22 | 15 |

COMPARATIVE EXAMPLE 3

Croissants were produced by the same method as the one described in the Example 1 except that the temperature of the roll-in fat was adjusted to 0° C.

COMPARATIVE EXAMPLE 4

Croissants were produced by the same method as the one described in the Example 1 except that the temperature of the dough in the final sheeting operation was adjusted to 12° C. (the dough was cooled in a refrigerator at 0° C. for 1 hour in the step of retardation 2 and the temperature of the layered dough was adjusted to 12° C. immediately before the final sheeting).

Tables 1 and 2 show the results of the evaluation of the croissants produced in the above Example 1 and Comparative Examples 1 to 4 and properties thereof observed during the production processes.

TABLE 1

| | Spreadability at rolling-in | | | Spreadability in molding | |
|---|---|---|---|---|---|
| | Dough | Fat | Compatibility of dough and fat | Dough | Fat |
| Ex. 1 | good | good | ⊙ | good | less spreadable, cracking. |
| Comp. Ex. 1 | good | less spreadable, nonuniform. | X | good | less spreadable, cracking. |
| Comp. Ex. 2 | good | good | ⊙ | good | incorporated into the dough. |
| Comp. Ex. 3 | somewhat good | less spreadable, nonuniform. | X | good | less spreadable, cracking. |
| Comp. Ex. 4 | good | good | ⊙ | good | Somewhat incorporated into the dough. |

TABLE 2

| | Evaluation of baked croissants | | |
|---|---|---|---|
| | Specific volume | Form | Inner phase |
| Ex. 1 | 6.2 | good | highly flaky. |
| Comp. Ex. 1 | 4.5 | part of the surface is smooth | some showing good flakiness and some showing poor flakiness are mixed together. |
| Comp. Ex. 2 | 5.4 | good | bread-like texture. |
| Comp. Ex. 3 | 6.0 | part of the surface is smooth | some showing good flakiness and some showing poor flakiness are mixed together. |
| Comp. Ex. 4 | 6.2 | good | bread-like texture. |

What is claimed is:

1. A process for producing a bakery product having a layered structure, which comprises combining dough and a roll-in fat which has a good spreadability at a temperature of 10° C. or above and rapidly hardens at a temperature lower than 10° C., said combining being performed at a temperature of 10° C. or above, and sheeting said combined dough and fat at a dough temperature lower than 10° C.

2. A process for producing a bakery product as claimed in claim 1, wherein the solid fat content of the roll-in fat is from 20 to 40, from 30 to 50, and 35 or above respectively at 15° C., 10° C. and 5° C.

3. A process for producing a bakery product as claimed in claim 1, wherein the folding number (i.e., the number of layers) in the rolling-in stage is from 8 and 36 in the case of Danish pastry or croissant and from 27 to 256 in the case of pie.

4. A process for producing a bakery product as claimed in claim 1, wherein the amount of the roll-in fat is from 10 to 50% by weight based on the dough.

* * * * *